United States Patent Office 2,874,159
Patented Feb. 17, 1959

2,874,159

STABILIZATION OF CERTAIN ALKENYL PYRIDINES

Warren L. Smith and Mack F. Potts, Bartlesville, Okla., and Paul S. Hudson, Iowa City, Iowa, assignors to Phillips Petroleum Company, a corporation of Delaware No Drawing. Application November 17, 1952
Serial No. 321,042

16 Claims. (Cl. 260—290)

This invention relates to the stabilization of polymerizable materials. In one of its aspects this invention relates to the stabilization of polymerizable heterocyclic nitrogen compounds under storage and handling conditions and during distillation or at elevated temperatures. In another of its more specific aspects, this invention relates to a method for preventing loss of heterocyclic nitrogen compounds due to polymerization.

It is well known that unsaturated, polymerizable heterocyclic nitrogen compounds tend to polymerize during storage and various handling conditions especially during distillation, and consequently yield and recovery of these compounds are often times considerably diminished because of this unwanted and undesirable polymerization. Also, besides reducing yields and recovery of these polymerizable heterocyclic nitrogen compounds, often the polymerized material adversely affects the reaction wherein these polymerizable compounds are employed as reactants, as well as their products which are derived from these reactions.

Each of the objects of this invention will be obtained by at least one of the aspects of this invention.

It is an object of this invention to prevent and/or inhibit the polymerization of polymerizable heterocyclic nitrogen compounds during storage and other handling conditions. It is another object of this invention to inhibit the polymerization of these materials at an elevated temperature and especially during distillation. It is still another object of this invention to provide polymerization inhibited compositions comprising a polymerizable heterocyclic nitrogen compound. It is yet another object of this invention to provide a polymerization inhibited composition comprising a vinyl-substituted pyridine. Another object of the invention is to provide a polymerization inhibited composition comprising vinyl-substituted pyrrole. Other and further objects and advantages of this invention will be apparent to those skilled in the art upon study of the accompanying disclosure.

In accordance with this invention, it has now been found that dinitrochloroanilines are effective as polymerization inhibitors for polymerizable heterocyclic nitrogen compounds. The dinitrochloroanilines which are applicable in the practice of this invention include 2,6-dinitro-4-chloroaniline, 2,4-dinitro-6-chloroaniline, 2,4-dinitro-3-chloroaniline, 2,5-dinitro - 4 - chloroaniline, as well as other dinitrochloroanilines. Dinitrochloroanilines which are applicable are compounds which can be represented by the formula

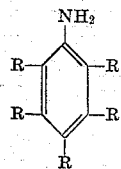

where R is selected from the group consisting of hydrogen, chloro, and nitro groups, one chloro and two nitro groups being present.

Dinitrochloroanilines are effective as polymerization inhibitors over a wide range of temperatures from below 40° F. to above 400° F. The amount of these polymerization-inhibiting dinitrochloroanilines which need be added to inhibit polymerization usually varies with the amount and type of polymerizable heterocyclic nitrogen compounds to be inhibited. Often a trace of these dinitrochloroanilines is sufficient in the presence of a polymerizable heterocyclic nitrogen compound to inhibit the polymerization of these compounds. Usually an amount of dinitrochloroaniline in the range of 0.001 to 5.0 percent by weight, preferably in the range of 0.05 to 1.0 percent by weight, based on the weight of the polymerizable heterocyclic nitrogen compound, is sufficient. Larger amounts of these dinitrochloroanilines, even as high as 10 percent by weight and higher can be used if desired, although under most circumstances this is not necessary. These stabilizing agents are effective in anhydrous systems as well as in systems where water is present.

Dinitrochloroanilines, in order to be especially effective, should preferably be in intimate contact with the polymerizable heterocyclic nitrogen compound. If desired, after addition of a dinitrochloroaniline to a polymerizable heterocyclic nitrogen compound, the admixture may be stirred to promote dispersion and/or solution of the dinitrochloroaniline therein. The dinitrochloroanilines are generally added to the polymerizable heterocyclic nitrogen compound in the form of fine powders and the mixture stirred and/or warmed.

The recovery of these dinitrochloroanilines from the polymerizable heterocyclic nitrogen compounds with which they are admixed is relatively simple and easily effected. After storage, handling or shipment of the stabilized polymerization-inhibited heterocyclic nitrogen compound, the compound can be easily and readily separated and recovered from the polymerization-inhibiting dinitrochloroanilines, either by distillation, preferably under reduced pressure, or by any other convenient method.

Preferred polymerizable heterocyclic nitrogen compounds which can be stabilized in accordance with our invention are the mono- and divinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferably methyl and ethyl groups. These preferred vinylpyridine compounds have the structural formula:

where R is selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethylpyridine; 2,3,4,trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-

(alpha-methylvinyl) pyridine; 3,5-di(alpha-methylvinyl) pyridine; and the like.

Those skilled in the art will appreciate that for the purposes of this invention the polymerization of compounds of the above nature substituted with non-interfering groups, for example halo- and nitro-, can also be inhibited.

Other polymerizable heterocyclic nitrogen compounds which can be used in the practice of this invention include those vinyl and alpha-methylvinyl substituted heterocyclic nitrogen compounds in which the ring structure is unsaturated, partially saturated and completely saturated. Examples include vinyl and alpha-methylvinyl substituted quinolines, isoquinolines, piperidines(hexahydropyri-, dines), pyrroles, pyrrolidines, pyrrolidones, especially the vinyl-substituted pyrrolidones, piperidines, pyrroles, pyrrolidines, quinolines, isoquinolines, dihydro and tetrahydropyridines, partially hydrogenated quinolines and isoquinolines, and pyrrolines (dihydropyrroles) and alkyl derivatives of the foregoing compounds. Examples of such compounds are 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; N-vinylpyrrolidone; 3-vinylpyrrolidone; N-vinylpyrrole; 4-vinylpyrrole; 3-vinylpiperidine; N-vinylpyrrolidine; 3-vinylpyrrolidine; N-vinylcarbazole; and 5-vinylcarbazole and the like.

The following specific examples are illustrative of this invention and specific details for operating the present invention are described with comparative results, showing the improvements obtained by this invention. However, as indicated, these examples are merely illustrative and not limitive of this invention.

*Example I*

The effectiveness of 2,6-dinitro-4-chloroaniline as an inhibitor for the polymerization of 2-methyl-5-vinylpyridine was determined by adding 0.2 percent by weight of this compound to 2-methyl-5-vinylpyridine and heating the mixture in an atmosphere of nitrogen for 24 hours at 185° F. The unreacted 2-methyl-5-vinylpyridine was removed by vacuum distillation at a pressure less than 1 mm. Hg. The polymer which remained was weighed and the percent 2-methyl-5-vinylpyridine polymerized was calculated. A second run was made in which no additive was present. The following results were obtained:

| Additive | Percent 2-methyl-5-vinyl-pyridine polymerized |
|---|---|
| 2,6-dinitro-4-chloroaniline | 1.16 |
| None | 23.0 |

*Example II*

Runs were made to determine the effectiveness of the following compounds as inhibitors for the polymerization of 2-methyl-5-vinylpyridine: p-bromoaniline, p-nitroaniline, m-dinitrobenzene, o-dinitrobenzene, o-nitrochlorobenzene, 2,4-diaminophenol hydrochloride, 2-amino-5-nitrophenol, 2,4,6-trinitrophenol, and dinitroresorcinol. The amount of each compound employed was 0.3 weight percent based on the 2-methyl-5-vinylpyridine. The mixtures were heated in an atmosphere of nitrogen for 24 hours at 200° F. These materials were found to be ineffective as polymerization inhibitors. In each test the sample became very viscous and in appearance was similar to a run in which 2-methyl-5-vinylpyridine was heated under the same conditions in the absence of an additive.

*Example III*

A run was made similar to those in Example I to test the effectiveness of 2,6-dinitro-4-chloroaniline as a polymerization inhibitor in a sample of 2-methyl-5-vinylpyridine containing 5 percent by weight of water. The result was as follows:

| Additive | Percent 2-methyl-5-vinyl-pyridine polymerized |
|---|---|
| 2,6-dinitro-4-chloroaniline | 1.37 |

It has been found that dinitrochloroanilines are effective stabilizers or polymerization inhibitors for vinyl-aromatic compounds such as styrene. It has also been found that compounds which have some of the same substituents in the benzene nucleus, i. e., compounds which in a sense could be considered similar to dinitrochloroanilines, such as p-bromoaniline, p-nitroaniline, m-dinitrobenzene, o-dinitrobenzene, o-nitrochlorobenzene, 2,4-diaminophenol hydrochloride, 2-amino-5-nitrophenol, 2,4,6-trichlorophenol, and dinitroresorcinol, are ineffective as stabilizers or polymerization inhibitors for polymerizable heterocyclic nitrogen compounds.

As will be obvious to those skilled in the art, many substitutions, variations and modifications can be made in the light of the foregoing disclosure without departing from the spirit or scope of this disclosure or invention.

We claim:

1. A process for inhibiting the polymerization of a polymerizable heterocyclic nitrogen compound having the general formula:

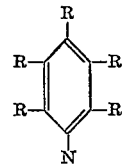

where R is selected from the group consisting of hydrogen, alkyl, vinyl and isopropenyl (alpha-methylvinyl) groups, at least one and not more than two of said groups being selected from the group consisting of vinyl and isopropenyl groups, the total number of carbon atoms in the alkyl groups being not greater than 12, said process comprising adding to said heterocyclic nitrogen compound an inhibiting amount of dinitrochloroaniline of the formula:

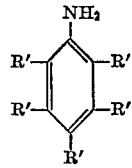

where R' is selected from the group consisting of hydrogen, chloro and nitro groups, a sole chloro and only two nitro groups being present.

2. The process of claim 1 wherein the dinitrochloroaniline is added in an amount in the range of 0.001 and 5.0 weight percent based upon said polymerizable heterocyclic nitrogen compound.

3. The process of claim 2 wherein the dinitrochloroaniline is 2,4-dinitro-6-chloroaniline.

4. The process of claim 2 wherein the dinitrochloroaniline is 2,4-dinitro-3-chloroaniline.

5. The process of claim 2 wherein the dinitrochloroaniline is 2,5-dinitro-4-chloroaniline.

6. The process of claim 2 wherein the dinitrochloroaniline is 2,6-dinitro-4-chloroaniline.

7. The process of claim 6 wherein the polymerizable heterocyclic nitrogen compound is 2-methyl-5-vinylpyridine.

8. The process of claim 6 wherein the polymerizable heterocyclic nitrogen compound is 2-vinylpyridine.

9. The process of claim 6 wherein the polymerizable heterocyclic nitrogen compound is 2-vinyl-5-ethylpyridine.

10. The process of claim 6 wherein the polymerizable heterocyclic nitrogen compound is 3-ethyl-5-vinylpyridine.

11. As a composition of matter, a polymerizable heterocylic compound having the general formula:

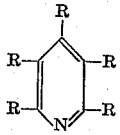

where R is selected from the group consisting of hydrogen, alkyl, vinyl and isoprenyl (alpha-methylvinyl) groups, at least one and not more than two of said groups being selected from the group consisting of vinyl and isopropenyl groups, the total number of carbon atoms in the alkyl groups being not greater than 12 stabilized with a dinitrochloroaniline having the general formula:

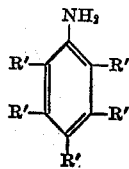

where R' is selected from the group consisting of hydrogen, chloro and nitro groups, a sole chloro and only two nitro groups being present.

12. The composition of claim 11 wherein the dinitrochloroaniline is present in an amount in the range of 0.001 and 5.0 weight per cent based on said heterocyclic nitrogen compound.

13. The composition of claim 12 wherein the dinitrochloroaniline is 2,6-dinitro-4-chloroaniline.

14. The composition of claim 12 wherein the dinitrochloroaniline is 2,4-dinitro-6-chloroaniline.

15. The composition of claim 12 wherein the dinitrochloroaniline is 2,4-dinitro-3-chloroaniline.

16. The composition of claim 12 wherein the dinitrochloroaniline is 2,5-dinitro-4-chloroaniline.

References Cited in the file of this patent

UNITED STATES PATENTS 2,556,845     Kauffman _____ June 12, 1951

OTHER REFERENCES

Dunbrook et al.: Official Gazette, vol. 644, pages 623–624 (1951).

Foord: J. Chem. Soc. (London), vol. 1940, pages 48–51.

UNITED STATES PATENT OFFICE
CERTIFICATE OF CORRECTION

Patent No. 2,874,159                                          February 17, 1959

Warren L. Smith et al.

It is hereby certified that error appears in the printed specification of the above numbered patent requiring correction and that the said Letters Patent should read as corrected below.

Column 3, line 38, for "0.2 percent" read -- 0.3 percent --; column 5, line 12, for "isoprenyl" read -- isopropenyl --.

Signed and sealed this 16th day of February 1960.

(SEAL)
Attest:

KARL H. AXLINE                                                ROBERT C. WATSON
Attesting Officer                                        Commissioner of Patents